United States Patent [19]
Sugita et al.

[11] Patent Number: 5,471,832
[45] Date of Patent: Dec. 5, 1995

[54] COMBINED CYCLE POWER PLANT

[75] Inventors: Shigehisa Sugita, Hitachi; Shozo Nakamura, Hitachioota; Nobuhiro Seiki, Hitachi; Shinichi Hoizumi, Hitachi; Toshihiko Sasaki, Hitachi; Yoshiki Noguchi, Hitachi, all of Japan

[73] Assignee: Hitachi, Ltd., Tokyo, Japan

[21] Appl. No.: 207,619

[22] Filed: Mar. 9, 1994

[30] Foreign Application Priority Data

Mar. 11, 1993 [JP] Japan .................. 5-050368

[51] Int. Cl.⁶ .................................................. F02C 6/18
[52] U.S. Cl. ............................ 60/39.141; 60/39.182
[58] Field of Search ...................... 60/39.05, 39.141, 60/39.15, 39.182, 39.54; 122/7 R

[56] References Cited

U.S. PATENT DOCUMENTS

| 4,424,668 | 1/1984 | Mukherjee | 60/39.182 |
| 4,571,935 | 2/1986 | Rice | 60/39.141 |
| 5,340,274 | 8/1994 | Cunha | 60/39.54 |

FOREIGN PATENT DOCUMENTS

| 62-279209 | 12/1987 | Japan . |
| 3-41644 | 6/1991 | Japan . |
| 4-148035 | 5/1992 | Japan . |
| 4-272409 | 9/1992 | Japan . |
| 2236145 | 3/1991 | United Kingdom . |

Primary Examiner—Louis J. Casaregola
Attorney, Agent, or Firm—Fay, Sharpe, Beall, Fagan, Minnich & McKee

[57] ABSTRACT

A combined cycle power plant has a plurality of gas turbine units each having a gas turbine and a heat recovery boiler for generating steam from heat from exhaust gas from the gas turbine. The gas turbine of a first one of the gas turbine units is a steam-cooled gas turbine. Steam turbines are driven by steam from the heat recovery boilers. For start-up of the first gas turbine unit, cooling steam generated in a heat recovery boiler different from not being the heat recovery boiler of the first gas turbine unit is fed to the steam-cooled gas turbine to effect cooling thereof during at least part of the start-up operation of the first gas turbine unit.

9 Claims, 10 Drawing Sheets

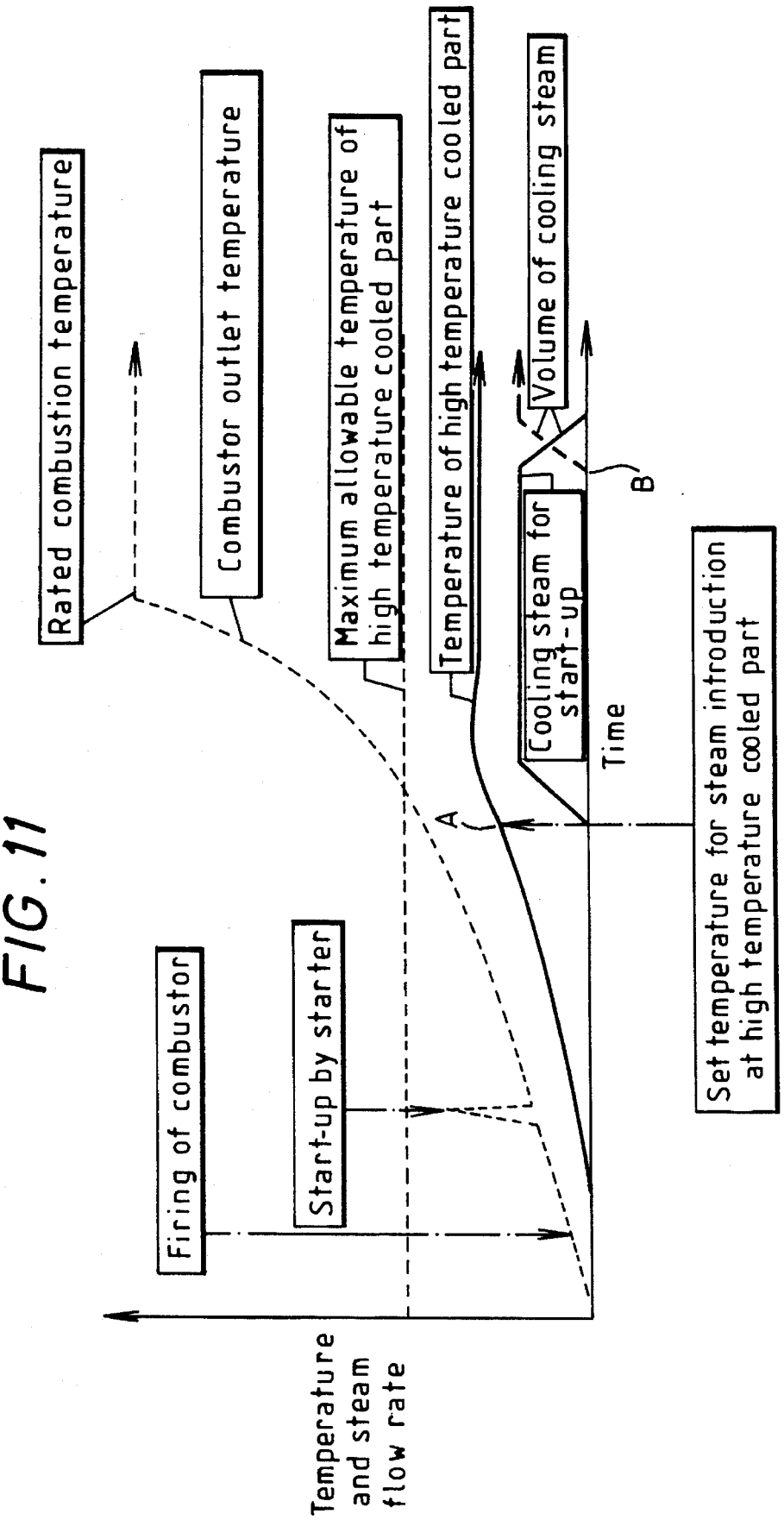

COMBINED CYCLE POWER PLANT

BACKGROUND OF THE INVENTION

1. Field of the Invention

The present invention relates to a combined cycle power plant having prime movers driven by gas turbines and steam obtained from the waste heat from the gas turbines, and to a method of operation of such a plant.

2. Description of the Related Art

In a combined cycle power plant system, it is required to cool a high temperature part of a gas turbine such as the turbine moving blade.

Increased efficiency of the operation of the combined cycle power plant can be achieved by increasing the gas turbine inlet temperature, but this temperature increase makes cooling of high temperature parts of the turbine more critical. Air cooling can consume a substantial part of the compressed air from the compressor driven by the turbine.

In view of the higher specific heat and thermal conductivity of steam, it has been proposed to use steam to cool the high temperature part of the gas turbine, as disclosed in JP-A-4-148035. In this proposed steam cooling gas turbine system, heat is exchanged between the exhaust gas of the gas turbine and feed water by a waste heat recovery boiler, and the generated steam is fed to the high temperature part of the gas turbine to cool it. At the time of start-up, when steam is not yet generated by the waste heat recovery boiler, or at the time of shut-down, the compressed air of the gas turbine compressor is fed to the high temperature part of the gas turbine to cool the high temperature part. This temporary use of compressed air is disadvantageous, however, because the cooling structure cannot be optimized for both steam and air as coolants. Moreover, a large amount of compressed air is required for cooling, reducing the amount available for combustion.

Start-up and shut-down of a combined cycle power plant may typically occur once per day each, and therefore a rapid and efficient start-up procedure is required.

Additionally JP-B-3-41644 describes the supply of steam from another source to drive the steam turbine of a combined cycle power plant during start-up. The gas turbine in this plant, however, is not steam-cooled.

SUMMARY OF THE INVENTION

The object of the present invention is to provide a combined cycle power plant and a method of its operation, in which steam generated by the combined plant is effectively used to cool the high temperature part of the gas turbine when the combined plant is started, particularly in the case where the plant has a plurality of gas turbine units.

In one aspect, the invention provides a combined cycle power plant having:

(i) a plurality of gas turbine units each having a gas turbine and a heat recovery boiler for generating steam from heat from exhaust gas from the gas turbine, the gas turbine of a first one of the gas turbine units being a steam-cooled gas turbine adapted for cooling of a high temperature part thereof by steam;

(ii) at least one steam turbine driven by steam from at least one of the heat recovery boilers; and (iii) means for feeding cooling steam generated in one heat recovery boiler other then the heat recovery boiler of the first gas turbine unit, to the steam-cooled gas turbine of the first gas turbine unit to effect cooling thereof at least during a start-up operation of the first gas turbine unit.

The use of steam from one gas turbine unit as cooling steam for another gas turbine increases efficiency, as described below.

The cooling steam from the steam-cooled gas turbine, after cooling thereof, may be fed to the steam turbine.

Furthermore, steam generated in the heat recovery boiler of the first gas turbine unit may be fed to the steam-cooled gas turbine of the first gas turbine unit, after completion of the start-up operation.

In another aspect, the invention provides a combined cycle power plant, having:

(i) a first combined cycle power unit having a first gas turbine, a first heat recovery boiler for generating steam from heat from exhaust gas from the first gas turbine, and a first steam turbine driven by steam generated by the first heat recovery boiler, the first gas turbine having a high temperature part which is adapted to be cooled by steam and having a cooling steam inlet and a cooling steam outlet;

(ii) a second combined cycle power unit having a second gas turbine, a second heat recovery boiler for generating steam from heat from exhaust gas of the second gas turbine and a second steam turbine driven by steam generated by the second heat recovery boiler; and (iii) first conduit means connecting the second heat recovery boiler to the cooling steam inlet of the first gas turbine for supplying cooling steam thereto, for cooling of the high temperature part thereof at least during start-up of the first combined cycle power unit.

In yet another aspect, the invention provides a combined cycle power plant, having:

(i) a first combined cycle power unit having a first gas turbine, a first heat recovery boiler for generating steam from heat from exhaust gas from the first gas turbine, and a first steam turbine driven by steam generated by the first heat recovery boiler, the first gas turbine being steam-cooled;

(ii) a second combined cycle power unit having a second gas turbine, and a second heat recovery boiler for generating steam from heat from exhaust gas of the second gas turbine, the second gas turbine being air-cooled;

(iii) at least one steam turbine driven by steam from at least one of the first and second heat recovery boilers; and (iv) conduit means for supply of steam from the second heat recovery boiler to the first gas turbine as cooling steam therefor.

In its method aspect, the invention provides a method of operating a combined cycle power plant in which a plurality of gas turbine units each have a gas turbine and a heat recovery boiler for generating steam from heat of exhaust gas of the gas turbine, and in which at least one steam turbine is driven by steam from at least one of the heat recovery boilers, the method comprising the step of, during start-up of a first one of the gas turbine units in which the gas turbine is a steam-cooled gas turbine, supplying cooling steam to said steam-cooled gas turbine from one of (a) said heat recovery boiler of a second one of the gas turbine units and (b) a steam header storing steam generated by at least one of the heat recovery boilers.

The arrangement of the present invention in a combined cycle power plant having more than one gas turbine unit permits use of the steam which is previously generated as cooling steam for the gas turbine unit which is being started. This feature allows the maximum use of steam cooling capacity with high cooling efficiency, when viewed over the whole plant, and ensures an effective operation of the combined cycle power plant. In particular, the use of steam cooling during start-up of at least one gas turbine unit achieves higher efficiency of operation of the plant, since waste heat is re-used. It can also avoid a need for, e.g. a large-capacity auxiliary boiler to provide starting steam.

BRIEF INTRODUCTION OF THE DRAWINGS

Embodiments of the present invention will now be described by way of non-limitative example with reference to the accompanying drawings, in which:

FIG. 11 is a graphical diagram showing start-up of a gas turbine unit and the cooling steam supply switching in an embodiment of the method of the invention.

DESCRIPTION OF THE PREFERRED EMBODIMENTS

Figure 1:
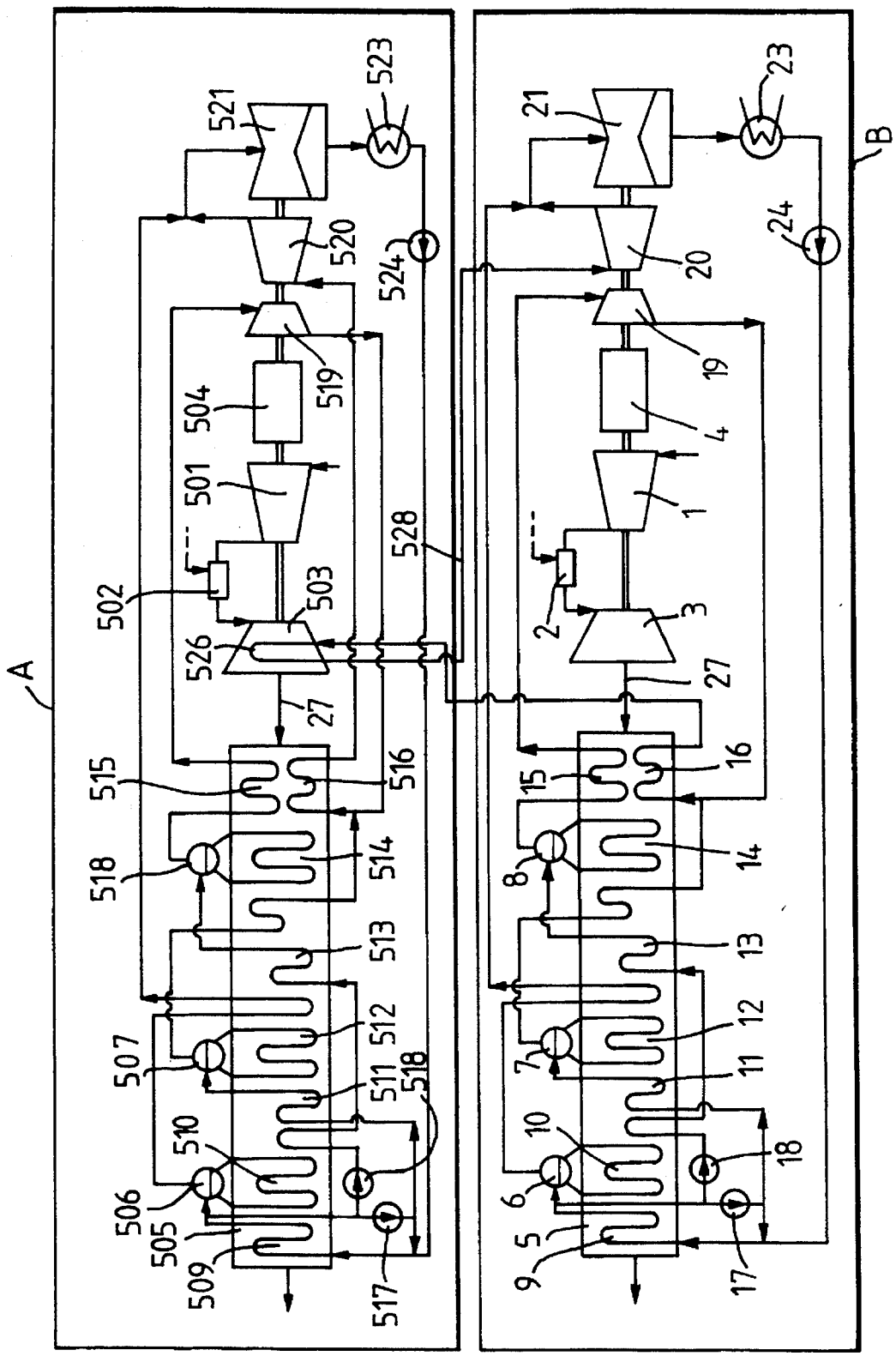
FIG. 1 is a schematic diagram of a first combined cycle power plant embodying the invention.
Figure 2:
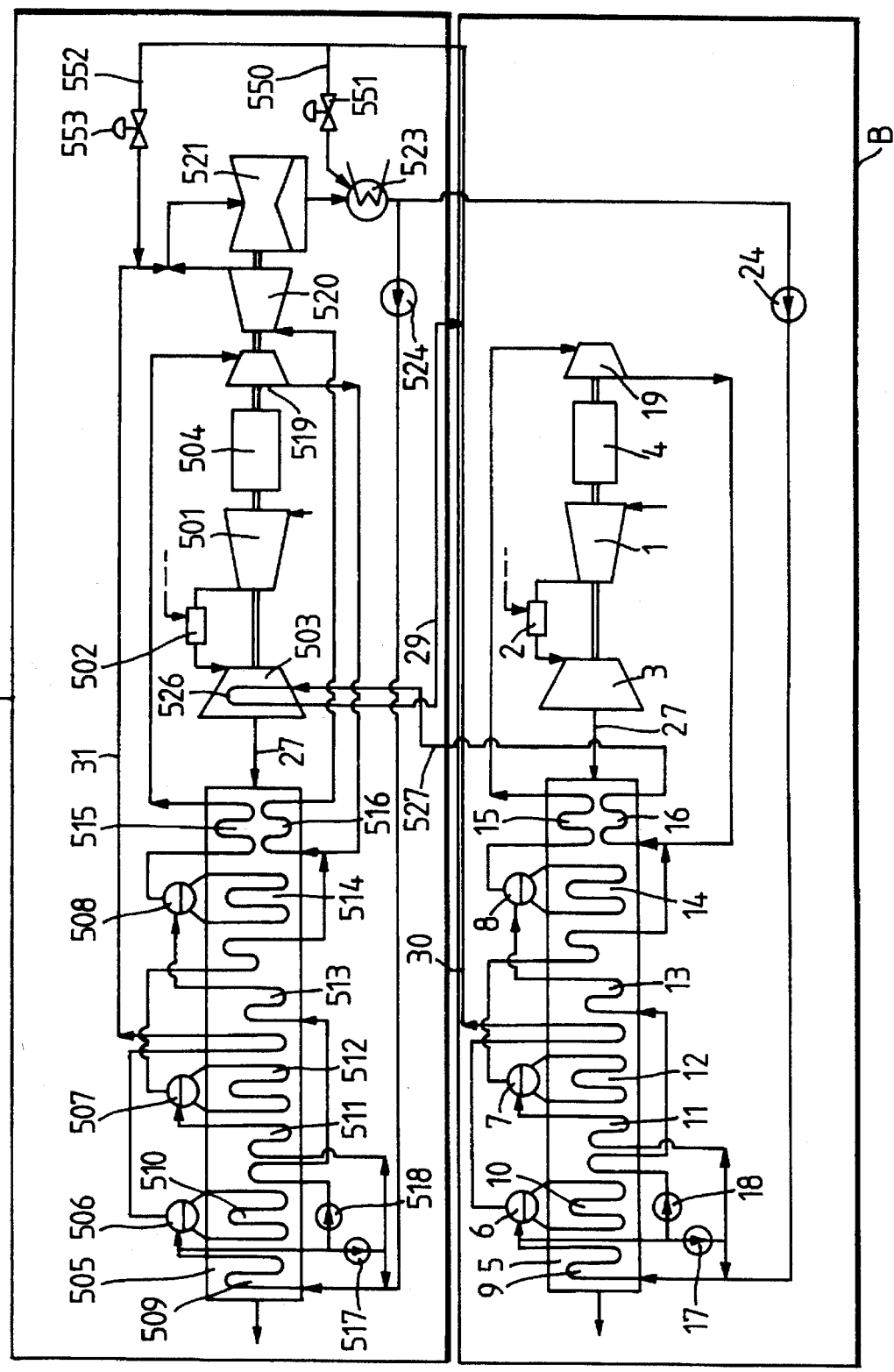
FIG. 2 is a schematic diagram illustrating a second combined cycle power plant embodying the invention.
Figure 10:
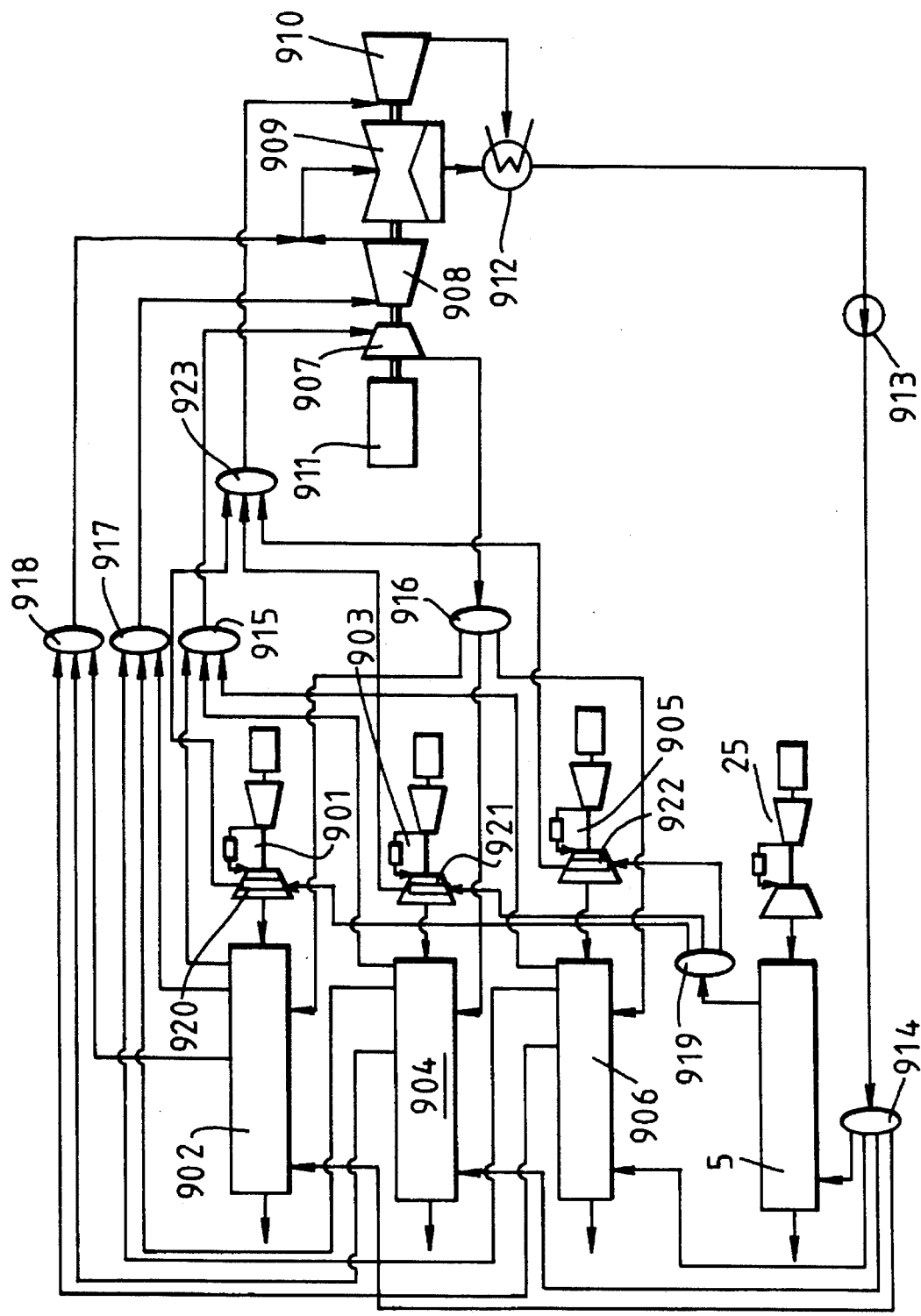
FIG. 10 is a schematic diagram representing the cooling system of another combined cycle power plant of the invention.

In the following description, parts having the same or corresponding functions have the same reference numerals (or corresponding reference numerals, as mentioned below) and will not be described redundantly. Furthermore, FIGS. 1 to 4 show combined cycle power plants having two combined cycle units for simplicity of description, but the invention is applicable to plants having more than two units, e.g. as illustrated by FIGS. 5 and 10. In the case of FIGS. 1 and 2, the combined cycle plant shown at the top part of each Figure (hereinafter referred to as the first combined cycle unit A) has almost the same configuration and operation as the combined cycle unit shown at the bottom part of each Figure (hereinafter referred to as the second combined cycle unit B). Thus, the initial digit 5 is added to the reference numerals for the second combined cycle unit B to provide the reference numerals for corresponding parts of the first combined cycle unit A.

Each of the combined cycle units A and B shown in FIG. 1 comprises a gas turbine unit, a waste heat recovery boiler, a steam turbine unit and a gas turbine cooling system.

The components of the second combined cycle unit B will be explained, but the same explanation applies to the first unit A. Of these components, the gas turbine comprises a compressor 1 to compress air, a combustor 2 which performs combustion using the compressed air and fuel, a gas turbine 3 which uses as a drive source the combustion gas obtained from this combustor 2, and a generator 4 which is driven by the gas turbine 3.

A waste heat recovery boiler 5 provides heat exchange between the exhaust gas 27 from the gas turbine 3 and feed water; in the direction from the upstream entry position of the exhaust gas 27, the boiler 5 is provided with a heater 15, a reheater 16, a high pressure evaporator 14 (high pressure drum 8), a high pressure economizer 13, an intermediate pressure evaporator 12 (intermediate pressure drum 7), an intermediate pressure economizer 11, a low pressure evaporator 10 (low pressure drum 6) and a low pressure economizer 9, in that order. Water is fed from a condenser 23 to the boiler 5 through a feed water pump 24; then it is fed from the low pressure economizer 9 to the low pressure evaporator 10 (low pressure drum from intermediate pressure economizer 11 to intermediate pressure evaporator 12 (intermediate pressure drum 7), and from high pressure economizer 13 to high pressure evaporator 14 (high pressure drum 8), thereby generating low, intermediate, and high pressure steam. These flows is provided by an intermediate pressure pump 17, and a high pressure pump 18.

The steam turbine unit comprises a high pressure steam turbine 19, a reheat steam turbine 20, and low pressure steam turbine 21. The generator 4 is driven by this steam turbine unit as well as by the gas turbine.

The gas turbine cooling system serves to cool at least one high temperature part of the gas turbine metal, using steam as the cooling medium. In the case of the first combined cycle unit A, this steam cooling system feeds the steam generated by the waste heat recovery boiler 5 of the second combined cycle power unit (steam reheated by reheater 16 in this case) through a cooling steam feed pipe 527 to gas turbine 503 of the first combined cycle unit A, where it cools metal high temperature part 526. Then the steam, after performing the cooling, is recovered to a steam turbine (reheat steam turbine 20 in this case) of the second unit B through a cooling steam return pipe 528. The metal high temperature part of the second unit B is cooled by, for example, air-cooling from the compressor 1.

The following describes the operation of this embodiment:

Since the first combined cycle unit A has no cooling steam at the time of its start-up, the second combined cycle unit B using the air cooling system is started first. Then, when steam of the second combined plant has been established, part of this steam is fed to the gas turbine metal high temperature part of the first unit A. This allows the first unit A to be started up.

In more detail, air and fuel are burnt in the combustor 2 in order to start the second unit B, and the gas turbine 3 is started by the resulting gas. The metal high temperature part of this gas turbine 3 is cooled, for example, by air of the compressor 1, as discussed previously. The combustion gas which has driven the gas turbine 3 is fed to the waste heat recovery boiler 5 as exhaust gas flow 27, and exchanges heat with the water fed from the feed water pump 24; thus, low, intermediate, and high pressure steam flows is produced by the high pressure evaporator 14 (high pressure drum 8), intermediate pressure evaporator 12 (intermediate pressure drum 7) and low pressure evaporator 10 (low pressure drum 6), respectively. The high pressure steam is fed to the high pressure steam turbine 19 to drive this turbine. The intermediate pressure steam, together with the exhaust steam from the high pressure steam turbine 19, is reheated by the reheater 16, and is fed via the pipe 527 to gas turbine 503 of the first unit A to cool the metal high temperature part thereof.

After effecting cooling, this steam is fed to the reheat steam turbine 20 to drive it, and is then fed to low pressure steam turbine 21 together with the low pressure steam from the evaporator 6 to drive the turbine 21. Then the exhaust steam is condensed by the condenser 23 and is fed to the waste heat recovery boiler 5 through the feed water pump 24.

In the first unit A, part of the steam established after the second unit B is started is supplied to cool the metal high temperature part 526 of gas turbine 503; this allows start up of the first unit A.

The process of starting up the first unit A will not be described here since it is generally the same as that of the second unit B, except for the steam cooling of the turbine 503. The cooling steam supply can be started before or after start up of the gas turbine 503. The maximum allowable temperature at the metal high temperature part 526 is currently about 900° C. Assuming that the cooling steam temperature (reheat steam temperature) is equal to the maximum practical steam temperature (593° C.), sufficient colling is achieved when starting at a low combustion temperature, but, if combustion temperature is increased due to increased gas turbine temperature in the future, it may be necessary to reduce the cooling steam temperature. In such a case, the cooling steam temperature can be reduced by installing a cooling device on the cooling steam feed pipe 527, or by spraying warm water from the feed water system into the cooling steam (not illustrated).

As discussed above, in the present embodiment, the cooling steam required at the time of the combined cycle plant start-up can be obtained by installing the cooling steam feed pipe 527 which feeds the steam generated by the waste heat recovery boiler 5 of the second unit B to the high temperature metal part of the gas turbine of the first unit A. Having cooled the high temperature part, the steam is recovered to the steam turbine of the second unit B, which permits the heat derived from the cooling to be recovered as high-temperature steam, resulting in substantial increase of efficiency.

FIG. 2 shows another embodiment of the present invention, and since this embodiment has almost the same configuration and operation as the embodiment of FIG. 1, the following describes only the difference from FIG. 1.

The combined cycle power plant system illustrated in FIG. 2 is designed so that the steam turbine of the second unit B consists only of a high pressure steam turbine 19, and the steam generated by the low pressure evaporator 10 (low pressure drum 6) of the waste heat recovery boiler 5 is fed to the condenser 523 of the first unit A via a pipe 30 and a cooling steam return pipe 552 (into which a discharge pipe 529 for the cooling steam from the gas turbine 503 also connects) through low pressure steam turbine 521 of the second combined plant, or directly via a cooling steam discharge pipe 550. This is controlled by a cooling steam discharge valve 551 and a cooling steam return valve 553.

In this embodiment, the second unit B using air cooling is started first. When steam is established in the second unit B, part of this steam is fed to the gas turbine 503 of the first unit A via the pipe 527. However, since the first combined plant is not ready for start-up, the steam is discharged to the condenser 523 via the pipe 550. This causes the part 526 of the gas turbine 503 to be preheated. When the first unit A has been prepared for start-up, the cooling steam return valve 553 is opened, while the cooling steam discharge valve 551 is closed; then the cooling steam from the gas turbine 503 is fed to the cooling steam discharge valve 551 via the cooling steam return pipe 552, and the turbine 521 is driven. This drive causes the gas turbine system, which is directly connected via the generator 504, to be driven, and the first unit A is started.

Since only a high pressure steam turbine is present in the second unit B in the present embodiment; the structure of the steam turbines is simplified resulting in reduced construction cost. When the first unit A is started, its steam turbine is driven by the cooling steam which is fed to the high temperature part of the gas turbine 503, and the gas turbine system connected directly is started. This design eliminates the use of a starter to start the gas turbine system.

Figure 3:
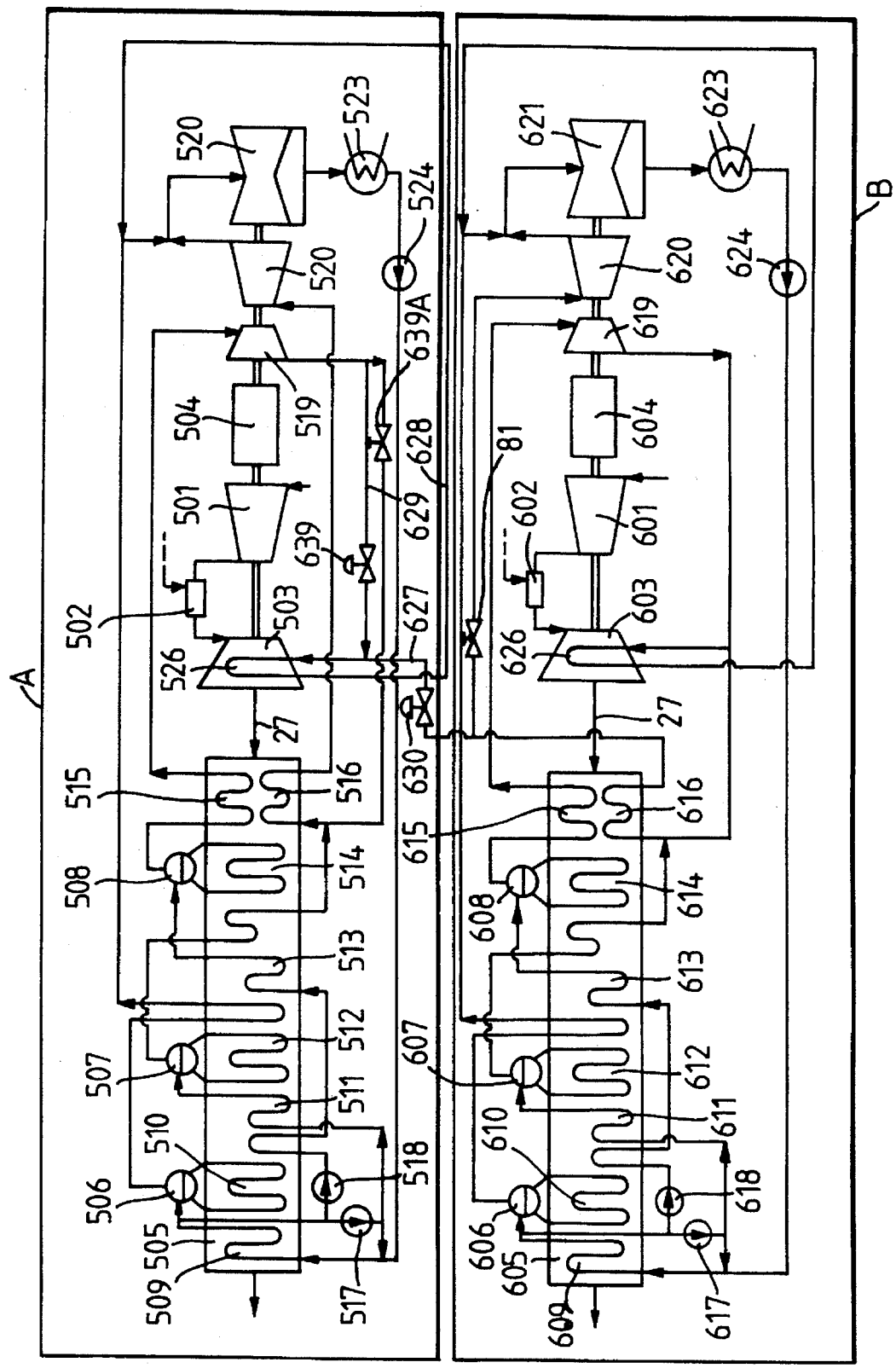
FIG. 3 is a schematic diagram of a third combined cycle power plant embodying the invention.

The combined cycle power plant system illustrated in FIG. 3 is provided with the steam cooling system to cool the high temperature metal part of the gas turbine by steam, and has the same configuration and operation as the plant illustrated in FIG. 1. Corresponding parts in the second unit B are given the same reference digit as in FIG. 1, now preceded by the numeral 6. For simplicity of explanation, part of the steam established in the combined cycle power unit B shown in the bottom part of the Figure (hereinafter referred to as the second unit B) is described as fed to the high temperature metal part of the gas turbine of the combined cycle unit shown in the top part of the Figure (hereinafter referred to as the first unit A); however, in practice, the plant can operate in the reverse manner (cooling steam supply from the first unit A to the second unit B).

The steam cooling system of the second unit B extracts part of the exhaust steam discharged from the high pressure steam turbine 619 driven by the high pressure steam generated by the high pressure evaporator 614 (high pressure drum 608) inside the waste heat recovery boiler 605, and supplies this to cool the high temperature metal part 626 of the gas turbine 603. Having effected the cooling the steam cooling is fed to the low pressure steam turbine 621 to drive it.

The steam cooling system of the first unit A, similarly to that of the second unit B, extracts part of the exhaust steam discharged from the high pressure steam turbine 519 which is driven by the high pressure steam generated by the high pressure evaporator 514 (high pressure drum 508) inside the waste heat recovery boiler 505, and supplies this to cool the high temperature metal part 526 of the gas turbine 503. This steam is then fed to the low pressure steam turbine 521, to drive it.

Steam from the waste heat recovery boiler 6 of the second unit B (specifically steam reheated by the reheater 616 in this case) can be fed to the gas turbine 503 of the first unit A via the cooling steam feed pipe 627 of the gas turbine 503 to cool the part 526. This is controlled by a cooling steam bypass valve 630 and a cooling steam supply valve 639.

FIG. 3 also shows an optional control valve 639A in the steam pipe carrying steam from the turbine 519 to the reheater 516. This valve 639A may be controlled in conjunction with the valve 639 (see below) to control the respective steam flows.

The following describes the operation of this combined cycle power plant, assuming that the second unit B is already started and its steam is already established.

When the first unit A is ready for start-up, the gas turbine 503 is started. Immediately after it is started, the temperature at the high temperature part 526 is low; condensation may occur if cooling steam is supplied under this condition. Therefore, starting is performed without cooling steam. When the temperature at the high temperature part 526 has exceeded a pre-set value, the cooling steam bypass valve 630 is opened and the steam reheated by reheater 616 of the boiler 605 of the second unit B is supplied to the gas turbine 503 via the pipe 627, to cool the part 526.

After that, steam is also generated in the boiler 505 of the first unit A, and its steam turbine is driven by this generated steam. If this steam meets the requirement for the cooling steam, the cooling steam supply valve 639 is gradually opened (cooling steam bypass valve 630 is gradually closed), and the high pressure steam from the turbine 519 is fed to the gas turbine 503 via the cooling steam feed pipe 629, to cool the part 526.

FIG. 3 also shows a control valve 81 in the pipe for high pressure steam to the turbine 619, whose operation is described below with reference to FIG. 9.

FIG. 11 shows a sequence of cooling steam flow in the operation of a plant such as that of FIG. 3. Temperature and steam flow rate are both plotted on the vertical axis, while time is indicated on the horizontal axis. When the gas turbine 503 is started, starting is performed without cooling steam in order to prevent condensation of the cooling steam at the metal parts of the turbine, as discussed earlier. The high temperature metal part of the turbine is preheated by combustion gas, resulting in gradually increased temperature. Before the combustion gas temperature exceeds the maximum permissible temperature of the part 526 of the turbine, namely at point A (a temperature at which the high temperature metal part 526 is below its maximum permissible temperature, and cooling steam does not condense), cooling steam is fed from the reheater 616 of the boiler 605 of the second unit B to part 526 of the gas turbine 503 via the cooling steam feed pipe 627.

When (i) the combustion temperature has reached the rated value, (ii) the combustor outlet temperature has become constant, (iii) steam is established in the first unit A, and (iv) this steam has met the requirements of cooling steam (namely, when point B has been reached), then the cooling steam supply valve 639 is gradually opened (and the cooling steam bypass valve 630 is gradually closed). The exhaust discharged from the high pressure steam turbine 519 is supplied to the gas turbine 503 via the cooling steam feed pipe 629 to cool the part 526.

Apart from the switch-over of cooling steam supply at point B, the method of FIG. 11 can be applied to the embodiments of FIGS. 1 and 2.

Figure 4:
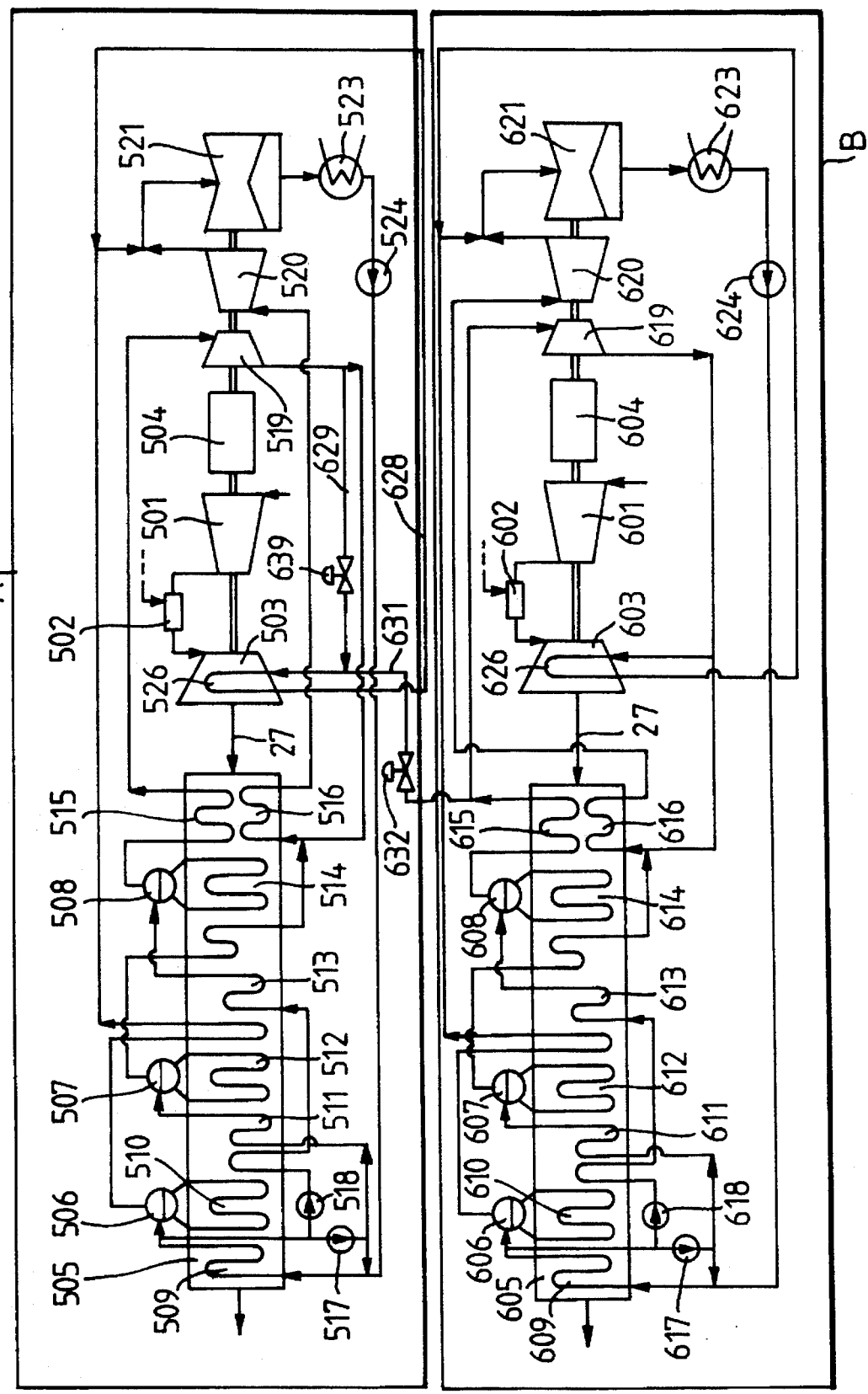
FIG. 4 is a schematic diagram of a fourth combined cycle power plant embodying the invention.
Figure 5:
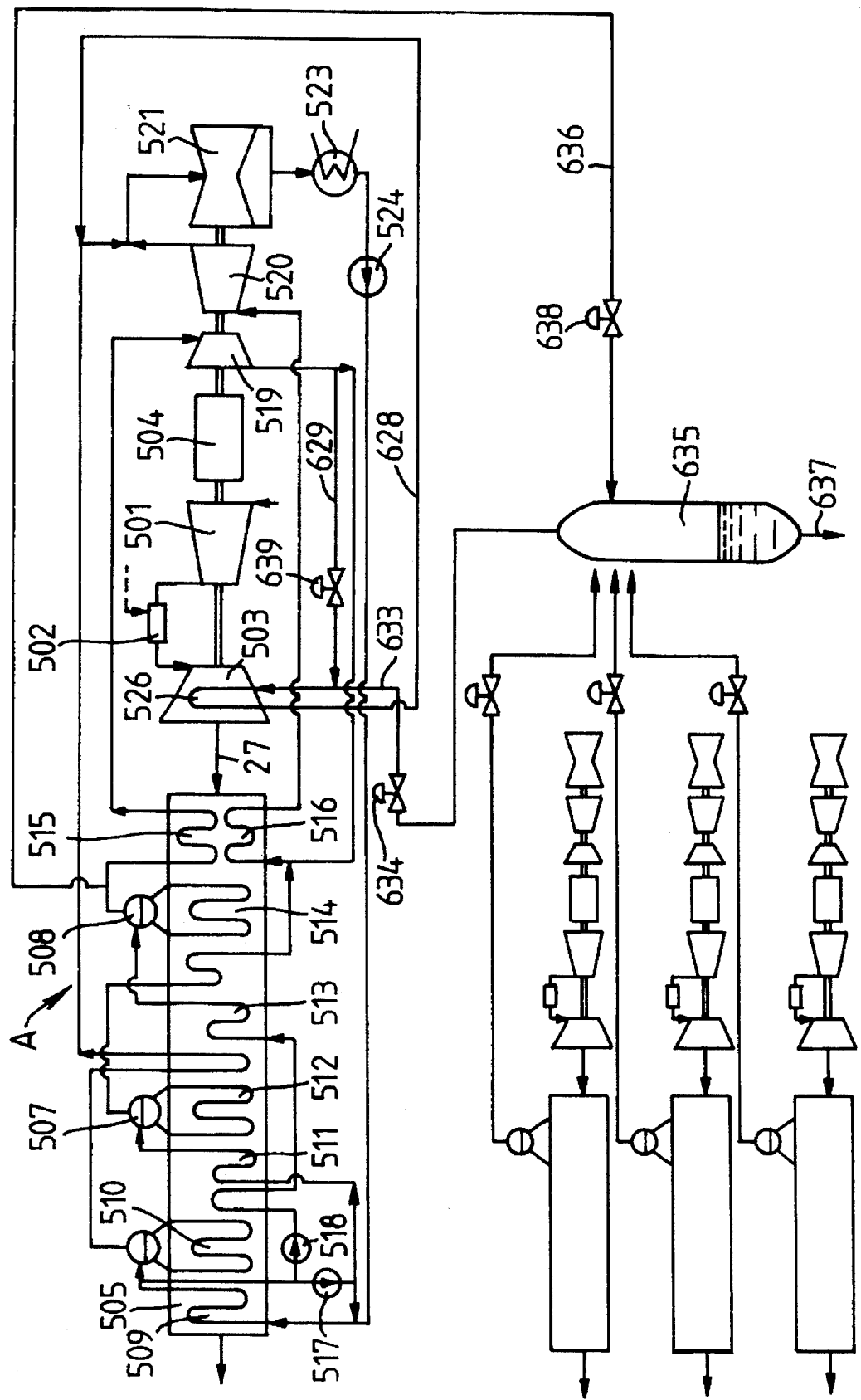
FIG. 5 is a schematic diagram illustrating a fifth combined cycle power plant embodying the invention.

As shown in FIG. 4, the high temperature metal part 526 can alternatively be cooled by feeding cooling steam to the gas turbine 503 via a cooling steam supply bypass pipe 631 from the superheater 615 of the boiler 605 of the second unit B, the pressure of this steam being reduced by a cooling steam supply pressure reducing valve 632, instead of the steam reheated by the reheater 616.

The combined cycle power plant illustrated in FIG. 5 is provided with a high pressure steam header 635 common to all the combined cycle units, and the steam generated by the high pressure evaporator (high pressure drum) of the waste heat recovery boiler of each unit is recovered to this header via high pressure steam recovery pipes 636. The high pressure steam stored by the header 635, whose pressure is reduced by cooling steam pressure reducing valve 634, is fed to the high temperature metal part 526 of gas turbine 503 via a cooling steam feed pipe 633. There is a drain pipe 637 for the header 635 and a high pressure steam recovery valve 638 in the pipe 636.

Since the steam generated in the waste heat recovery boiler after plant shutdown has a high thermal capacity, its temperature does not easily reduce in the header 635. In this case, the hot start method, in which the plant is stopped and restarted in a short time, is the optimum method. Therefore, at the time of start, this method allows cooling steam to be generated without new fuel consumption, thereby saving fuel cost. Also, any one of the four units may be shutdown and restarted using cooling steam from the header 635.

FIGS. 6 to 10 explain further the control of the combined cycle power plant system illustrated in FIG. 3.

Figure 6:
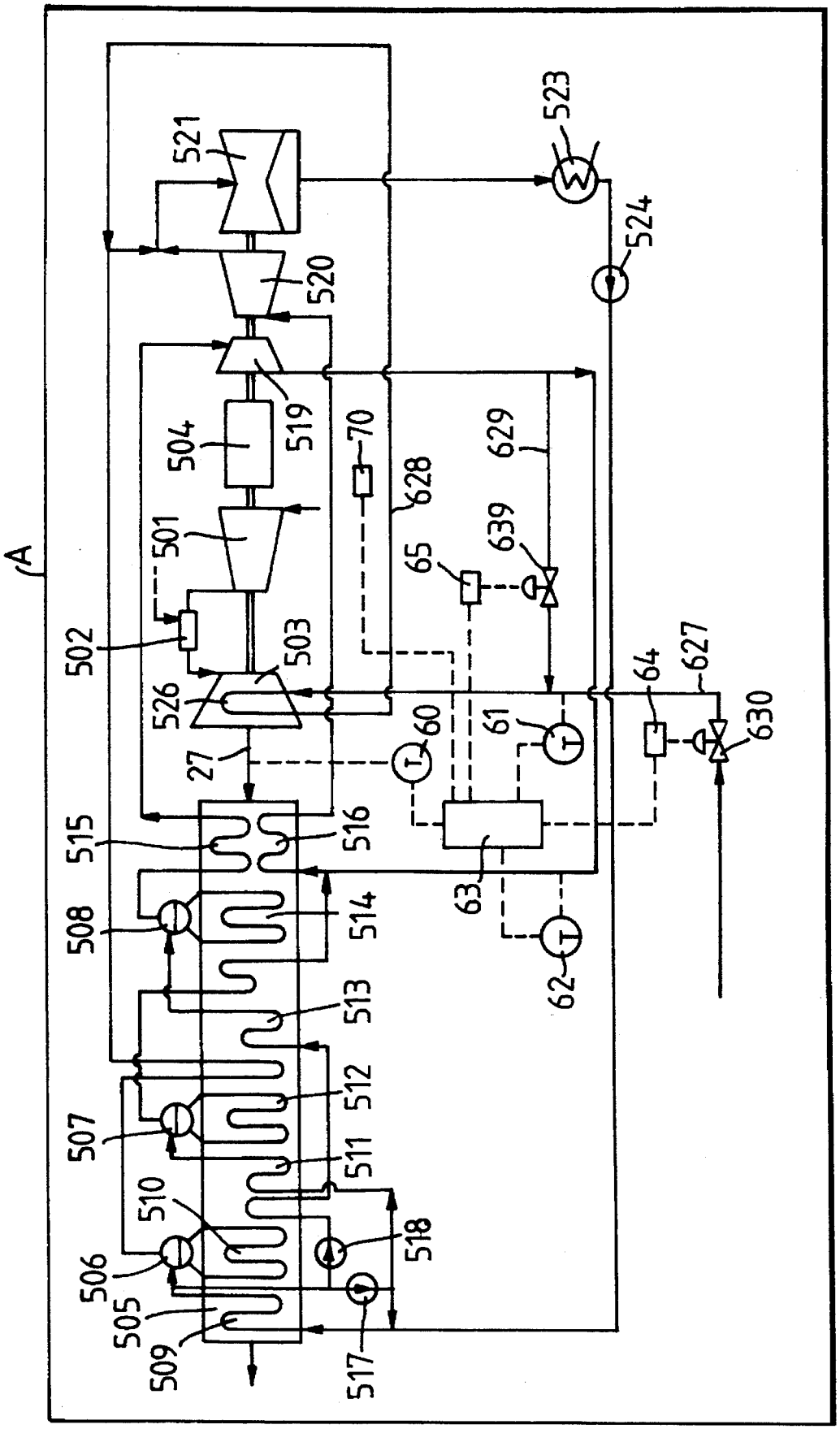
FIG. 6 is a schematic diagram of part of a combined cycle power plant embodying the invention, showing the control system of the cooling system of the plant.
Figure 7:
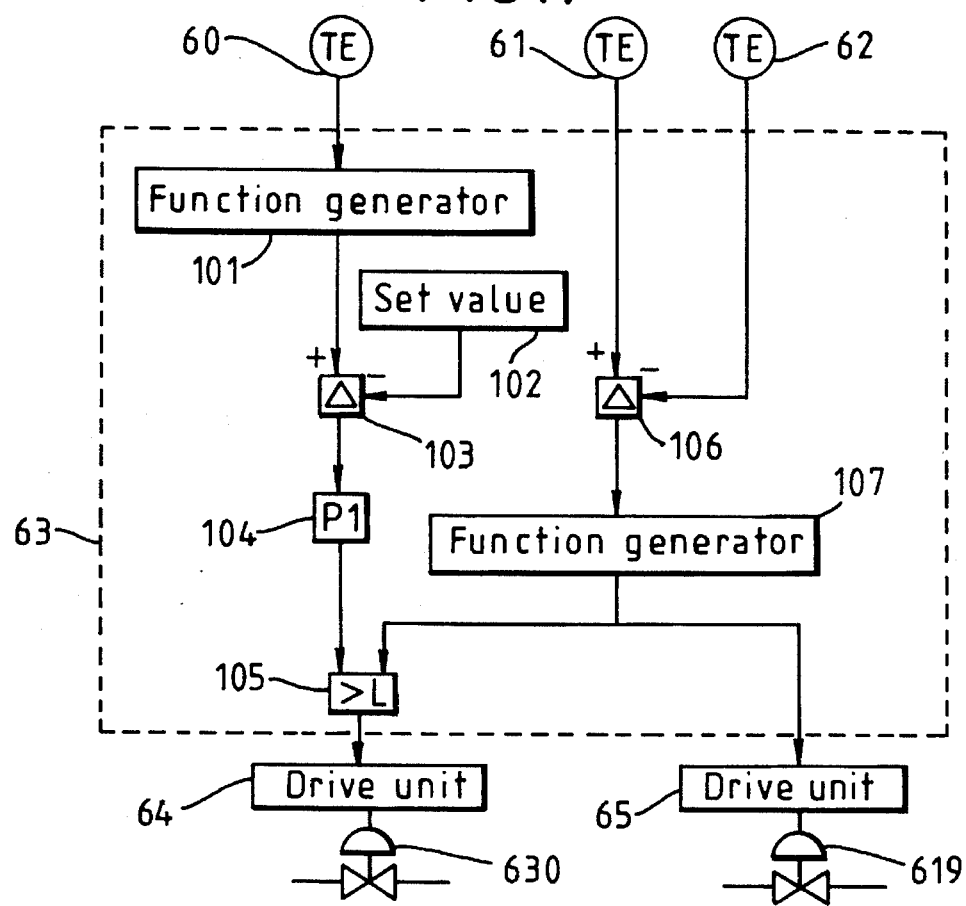
FIG. 7 is a schematic diagram showing the controller configuration in the control system of FIG. 6.

FIGS. 6 and 7 show the cooling steam switching controller 63 to be used when part of the steam generated by starting the second unit B is fed to part 526 of the gas turbine 503 at the time of starting the first unit A.

FIG. 6 shows a temperature detector 60 for detecting the temperature of the exhaust gas discharged from the gas turbine 503, and a temperature detector 62 for detecting the temperature of the exhaust steam discharged from the high pressure steam turbine 619. There is a temperature detector 61 for detecting the temperature of the cooling steam fed to the part 526 via cooling steam feed pipe 627. Also shown are drive units 64,65 to drive cooling steam bypass valve 630 and cooling steam supply valve 639, and the controller 63 which receives the signals of the temperature detectors 60, 61, and 62 for calculation and gives command signals to the drive units 64,65. The configuration and operation of the controller 63 will be described later with reference to FIG. 7. The following is a detailed description of steam switching.

In the initial stage of starting the gas turbine 503 of the first unit A, the turbine is started without using the cooling steam in order to prevent the cooling steam from being condensed. The temperature of part 526 is therefore gradually raised in conformity with the rise of combustion gas temperature, and the temperature of the exhaust gas of the turbine 503 is detected by detector 60 to obtain a temperature corresponding to that of the part 526. When this temperature has exceeded the set value (point A in FIG. 11), then the controller 63 gives a command to drive unit 64 of cooling steam bypass valve 630 to supply cooling steam to the part 526.

After that, when steam is established in the first unit A and the steam turbine 503 is driven, then the exhaust steam temperature (temperature detector 62) of high pressure steam turbine 519 and the temperature (temperature detector 61) of the cooling steam fed from the second unit B are compared with each other. When agreement is reached or the temperature of the exhaust steam has exceeded the cooling steam temperature, controller 63 gives a command to the drive unit 65 of the steam supply valve 639 to supply the exhaust steam from the turbine 519 to the part 526. At the same time, it gives a command to the drive unit 64 of the cooling steam bypass valve 630 to stop the steam supply from the second unit B.

The following describes the configuration and operation of the controller 63 with reference to FIG. 7.

For the control of closing and opening of the cooling steam bypass valve 630, the output of detector 60 is input into a function generator 101, and a temperature corresponding to that of part 526 of gas turbine 503 is produced. The difference of this temperature from the set value 102 (point A in FIG. 11) is obtained by subtracter 103. If this difference is positive, namely, if the temperature at the part 526 has exceeded the set value 102, then a proportional plus integral operation (proportional integrator 104) is performed, and a control signal is given to the drive unit 64 via the minimum gate 105, to open the valve 630. Closure of the cooling steam bypass valve 630 is controlled according to the temperature (from detector 61) of the cooling steam supplied via the pipe 627 and the detection signal (from detector 62) of the temperature of the exhaust steam of the turbine 519. The difference of these input signals is calculated by subtracter 106. When agreement is reached or the exhaust steam temperature has exceeded the cooling steam temperature, the CLOSE command signal is generated by function generator 107, and is transmitted to drive unit 64 via the minimum gate 105. This closes the valve 630 to stop the supply of cooling steam from the second unit B.

The control of the opening of the cooling steam supply bypass pipe 629 is effected also using, as input signals, the detection signals of temperature detectors 61 and 62.

When agreement is reached between the output of these two detectors or the temperature of exhaust steam has exceeded the cooling steam temperature, the OPEN command signal for the valve 639 is generated by function generator 107, and is transmitted to the drive unit 65. This opens the pipe 629, and the part 526 is supplied with the exhaust steam from the turbine 519, as cooling steam.

Figure 8:
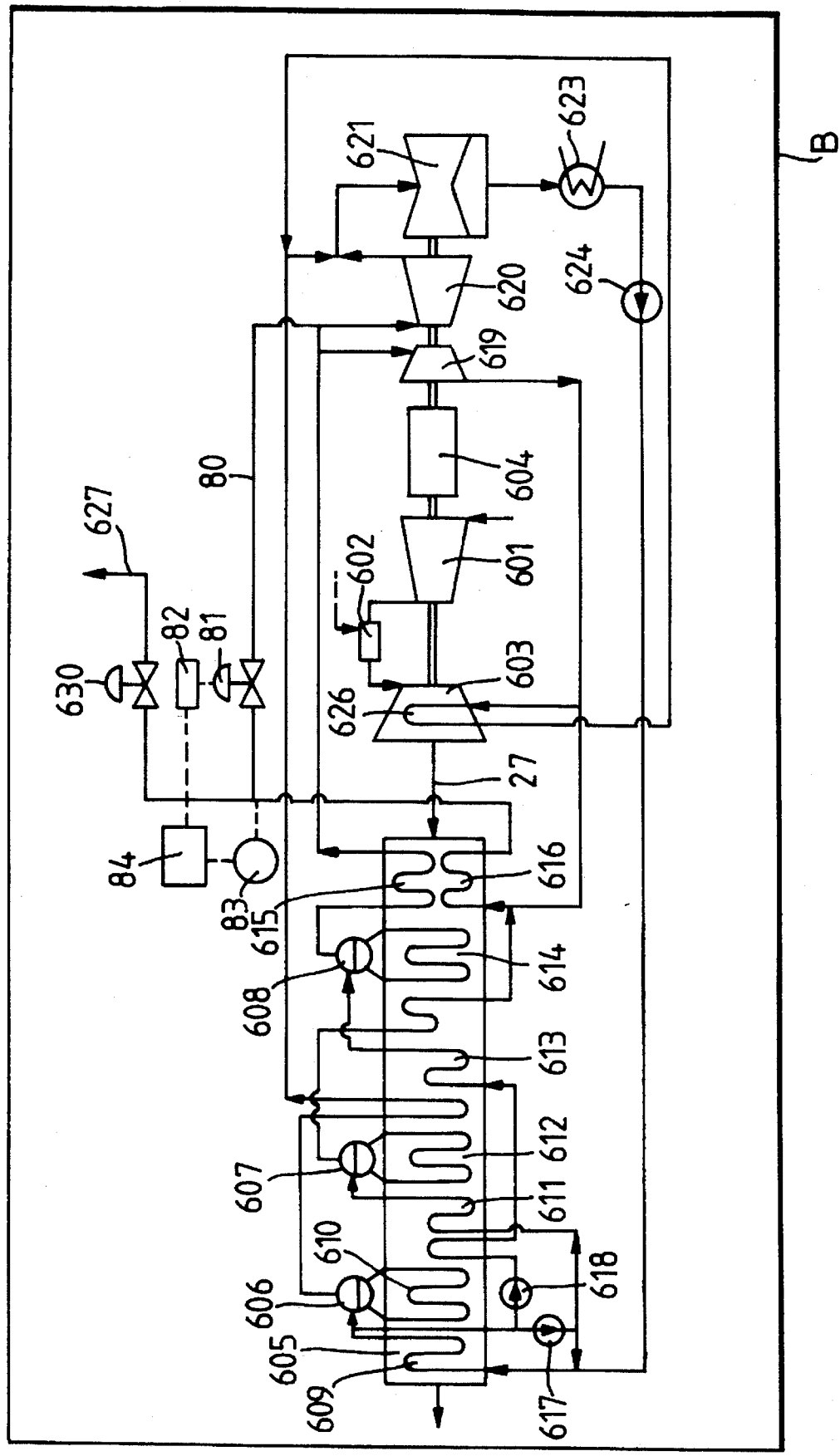
FIG. 8 is a schematic diagram illustrating a control system of the cooling system of a further combined cycle power plant of the invention.

FIG. 8 illustrates a controller 84 suitable to be installed (in FIG. 3) on the second unit B side, for control of the pressure of the steam to be fed to the reheat steam turbine. FIG. 8 shows a detector 83 for detecting the pressure of the steam reheated by the reheater 616, and a far driving unit 82 to drive a reheat steam supply pressure valve 81. The controller 84 receives the value measured by the pressure detector 83 and outputs a command signal to drive unit 82.

The cooling steam required for start of the first unit A is supplied by feeding the steam generated by waste heat recovery boiler 605. On the other hand, the volume of the steam supplied as cooling steam is then not supplied to the reheat steam generator 620. This causes the pressure at the inlet of reheat steam turbine 620 to be reduced, which, in turn, reduces the back pressure of high pressure steam turbine 619. As a result, the pressure ratio is increased and the load is also increased, possibly causing damage to the turbine. Pressure detector 83 detects the pressure of the steam supplied from reheater 616, and this detection value is used to control the valve 81.

Figure 9:
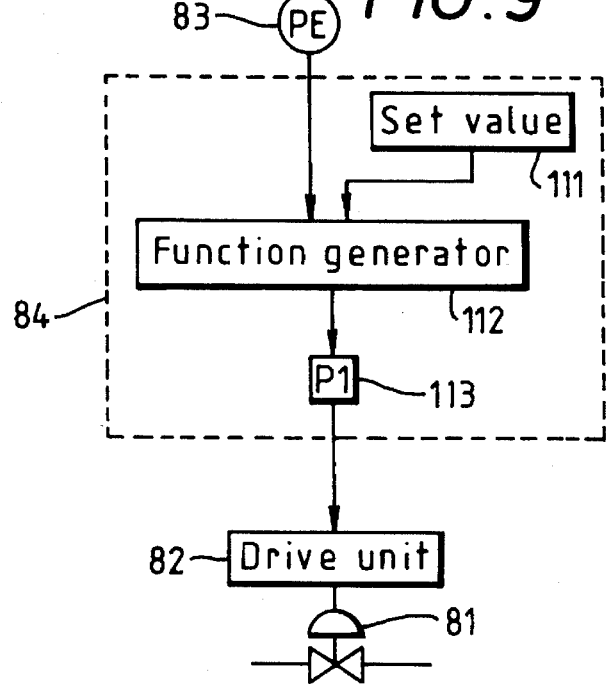
FIG. 9 is a schematic diagram showing a controller configuration in the control system of FIG. 8.

The following describes the configuration and operation of controller 84 with reference to FIG. 9.

When the steam generated by the boiler 605 of the second unit B is fed to the gas turbine 503 and to the reheat steam turbine 620, the opening of the valve 81 is controlled so that the pressure at the inlet of the turbine 620 is not reduced. For this control, the detection signal of the detector 83 installed on the outlet side of reheater 616 is used as the input signal.

The pressure detected by the detector 83 is input to the function generator 112 together with a set value 111, and function generator 112 produces from this input signal an output signal to control the opening of the valve 81. Then, a proportional plus integral operation (proportional integrator 113) is performed, and a control signal is given to drive unit 82 of the valve 81. This causes the pressure at the inlet of reheat steam turbine 620 to be maintained.

Introduction of the control discussed above in the present embodiment permits control of the change in the temperature at the high temperature metal part of the gas turbine of the unit A, without the cooling steam temperature being changed. It also ensures highly reliable operation in which the steam turbine pressure is not reduced even when steam of the second unit B is supplied to the first unit A.

The combined cycle power plant illustrated in FIG. 10 has, in principle, two or more combined cycle power units (four are actually shown) which are each provided with a gas turbine and a waste heat recovery boiler, but the steam turbines of the plants are integrated into a single common unit.

The four combined cycle units of FIG. 10 have respective gas turbines 25,901,903 and 905, and waste heat recovery boilers 5,902,904,906. The combined cycle unit having the gas turbine 25 and waste heat recovery boiler 5 is hereinafter referred to as the first combined unit. The combined unit having the gas turbine 901 and waste heat recovery boiler 902 is called the second combined unit, and so on. The steam turbine comprises high pressure steam turbine 907, reheat steam turbine 908, low pressure steam turbine 909, steam turbine for cooling steam 910, and generator 911.

FIG. 10 also shows a condenser 912, a feed water pump 913, a feed water header 914, a low pressure steam header 918, a reheat steam header 917, a high pressure steam header 915, a cooling steam header 913, an exhaust steam header 916, and a cooling steam supply header 919.

The first combined unit 25,5 is started first (its starting process need not be described). When steam is established in the first combined unit, this steam is fed to the cooling steam supply header 919, and is then supplied to gas turbines 901, 903, and 905 of the second, third, and fourth combined units, to cool the metal high temperature parts 920, 921, and 922 thereof. This permits the second, third, and fourth combined units to be started in sequence, which, in turn, causes high, intermediate, and low pressure steam to be generated by waste heat recovery boilers 902, 904, and 906. High pressure steam is fed to high pressure steam turbine 907, intermediate pressure steam to reheat steam turbine 908, and low pressure steam to low pressure steam turbine 909 via the high pressure steam header 915, reheat steam header 917, and low pressure steam header 918, respectively, to drive these turbines.

The steam having cooled the metal high temperature parts 920, 921, and 922 is fed to a steam turbine 910 for cooling steam via cooling steam header 923, to drive this turbine.

Exhaust from the low pressure steam turbine 909 and steam turbine 910 is condensed by condenser 912, and is supplied to waste heat recovery boilers 5, 902, 904 and 906 via feed water pump 913 and feed water header 914.

In this embodiment, the steam generated by the waste heat recovery boiler of the first combined unit is fed to the gas turbines of the second, third, and fourth combined units via the cooling steam supply header, and after having effected cooling, the steam is fed to the steam turbine for cooling steam via the cooling steam header to drive the turbine. This allows the pressure of the cooling steam system to be controlled in conformity to the gas turbine operating conditions.

While the invention has been illustrated by specific embodiments, these embodiments are not limitative of the invention, whose scope includes all variations and modifications within the inventive concept.

What is claimed is:

1. A combined cycle power plant having:
   (i) a plurality of gas turbine units each having a gas turbine and a heat recovery boiler for generating steam from heat from exhaust gas from the gas turbine, said gas turbine of a first one of said gas turbine units being a steam-cooled gas turbine adapted for cooling of a high temperature part thereof by steam;

(ii) at least one steam turbine driven by steam from at least one of said heat recovery boilers; and (iii) means for feeding cooling steam generated in one said heat recovery boiler, other than the heat recovery boiler of said first gas turbine unit, to said steam-cooled gas turbine of said first gas turbine unit to effect cooling thereof at least during a start-up operation of said first gas turbine unit.

2. A combined cycle power plant according to claim 1, having means for feeding said cooling steam from said steam-cooled gas turbine, after cooling thereof, to said steam turbine.

3. A combined cycle power plant according to claim 1, having means for feeding cooling steam generated in said heat recovery boiler of said first gas turbine unit to said steam-cooled gas turbine, after said start-up operation.

4. A combined cycle power plant according to claim 1, having a steam header, conduit means connecting said heat recovery boilers to said steam header for supply of steam thereto, and conduit means connecting said steam header to said steam-cooled gas turbine to supply cooling steam thereto.

5. A combined cycle power plant, having:

(i) a first combined cycle power unit having a first gas turbine, a first heat recovery boiler for generating steam from heat from exhaust gas from said first gas turbine and a first steam turbine driven by steam generated by said first heat recovery boiler, said first gas turbine having a high temperature part which is adapted to be cooled by steam and having a cooling steam inlet and a cooling steam outlet;

(ii) a second combined cycle power unit having a second gas turbine, a second heat recovery boiler for generating steam from heat from exhaust gas of said second gas turbine and a second steam turbine driven by steam generated by said second heat recovery boiler;

(iii) first conduit means connecting said second heat recovery boiler to said cooling steam inlet of said first gas turbine for supplying cooling steam thereto, for cooling of said high temperature part thereof at least during start-up of said first combined cycle power unit.

6. A combined cycle power plant according to claim 5, having second conduit means connecting said cooling steam outlet of said first gas turbine to said second steam turbine, for supply of cooling steam heated in said first gas turbine to said second steam turbine as driving steam therefor.

7. A combined cycle power plant according to claim 5, having third conduit means connecting said first heat recovery boiler to said cooling steam inlet of said first gas turbine for supplying cooling steam thereto, and valve means for selectively controlling the supply of cooling steam to said cooling steam inlet via said first and third conduit means.

8. A combined cycle power plant according to claim 5, having fourth conduit means connecting said second heat recovery boiler to said second steam turbine for supply of driving steam thereto, and control means for controlling pressure of steam supplied by said fourth conduit in dependence on steam pressure in said first conduit means.

9. A combined cycle power plant, having:

(i) a first combined cycle power unit having a first gas turbine, a first heat recovery boiler for generating steam from heat from exhaust gas from said first gas turbine, said first gas turbine being steam-cooled;

(ii) a second combined cycle power unit having a second gas turbine, a second heat recovery boiler for generating steam from heat from exhaust gas of said second gas turbine, said second gas turbine being air-cooled;

(iii) at least one steam turbine driven by steam from at least one of said first and second heat recovery boilers; and (iv) conduit means for supply of steam from said second heat recovery boiler to said first gas turbine as cooling steam therefor.

* * * * *